_United States Patent Office_

3,106,934
Patented Oct. 15, 1963

3,106,934
INTEGRATING AND PROPORTIONAL FLOW CONTROL APPARATUS
Francis R. Rogers and Robert R. Riggs, South Bend, Ind., assignors to The Bendix Corporation, a corporation of Delaware
Filed Dec. 24, 1958, Ser. No. 782,948
16 Claims. (Cl. 137—117)

The present invention relates to fluid control valve, and more particularly to a fluid control valve for controlling a head or pressure differential across the variable size orifice.

It is an object of the present invention to provide an improved and highly accurate head control valve which has in addition a high degree of stability.

It is another object of the present invention to provide a no-error integrating head control valve including damping means for valve stability arranged in the manner such that the valve response time is comparable to valves not employing damping means.

It is a further object of the present invention to provide a head control valve not subject to error due to fluid pressure unbalance across the valve.

It is a still further object of the present invention to provide a head control valve including resilient means such as springs, bellows, or the like for providing a reference force to the valve movable member, which reference force is maintained constant throughout the valve operating range.

Other objects and advantages will become apparent in view of the following description taken in conjunction with the drawings wherein.

Figure 1:
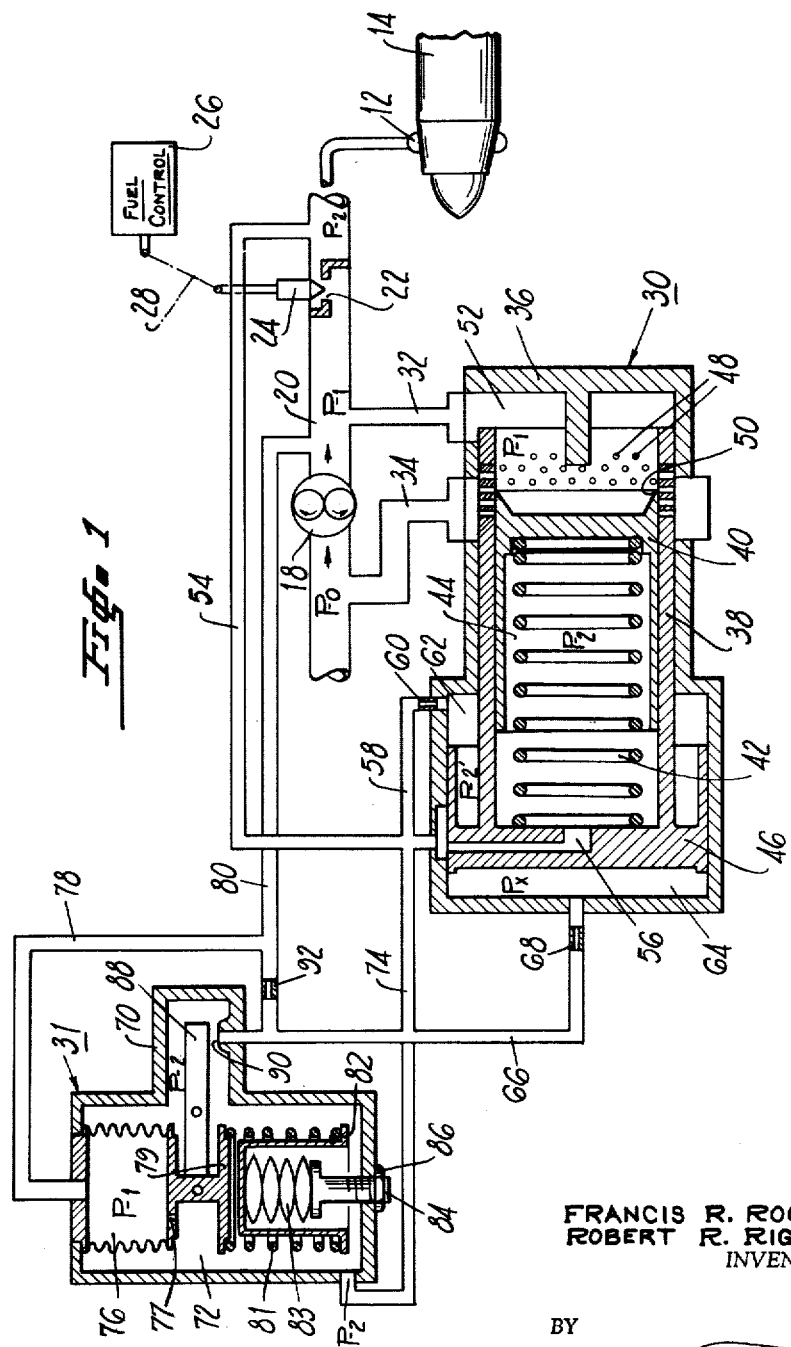
FIGURE 1 is a sectional schematic of a first form of our head control valve operating as a by-pass valve in a system for supplying fuel to an engine.

Referring to FIGURE 1, there is shown our fuel control valve operative with a system for supplying fuel to a manifold 12 of an engine 14. Fuel from a source, not shown, is supplied at a relatively low pressure (designated $P_0$) to conduit 16 which is connected to the inlet side of constant displacement pump 18. Pump 18 pressurizes the fuel to a relatively high value represented as $P_1$ and discharges said $P_1$ fluid into the pump outlet conduit 20, which conduit includes metering orifice 22 and is connected to the manifold 12 of the engine 14. Metering valve 24 is operative with orifice 22 in the conduit 20 such that the effective flow permitting area is controlled by axial movement of said metering valve. A fuel control 26 is connected to metering valve 24 by means of a mechanical connection represented by dashed line 28 so as to position said metering valve as a function of a predetermined schedule, engine operating parameters, or both such as, for example, in a manner similar to that disclosed in copending application Serial No. 499,432, filed April 5, 1955, Howard J. Williams, Francis R. Rogers and Basil J. Ryder, inventors, and assigned to the same assignee as is the present application. As the $P_1$ fluid in conduit 20 passes through the variable flow permitting area defined by orifice 22 and metering valve 24 it is reduced in pressure and is designed downstream of orifice 22 as $P_2$ fluid.

It is often desirable in a fuel supply system of the type described to control the pressure differential across the variable flow permitting area defined by orifice 22 and metering valve 24 at a constant or predetermined value such that the rate of fuel supplied to the manifold 12 will be solely dependent on the axial position of a metering valve and not additionally dependent on the fluid pressure across the valve. One method of maintaining a constant pressure differential across the variable orifice is to by-pass fluid away from said orifice back to the fluid source such as may be done in FIGURE 1 by by-passing fluid through the conduits 32 and 34 back to the inlet of pump 18. The amount of fluid being by-passed is then varied in amount to offset any errors in pressure differential across the variable orifice. In FIGURE 1 our novel valve apparatus is comprised of two parts; first a head sensing device generally indicated at 31 and second, a valve device generally indicated at 30. Head sensing device 31 and valve device 30 are cooperatively operative to control the amount of fluid being by-passed through conduits 32 and 34 of the fuel supply system to maintain a predetermined pressure differential across orifice 22 in a manner to be presently described. Valve device 30 is comprised of a housing 36, a first movable valve member 38 slidably contained within said housing, a second movable valve member 40 concentrically disposed within said first movable valve member, and a spring 42 contained in a chamber 44 formed by said first and second movable members. The first movable valve member 38 includes a servo piston 46 formed on one end thereof, and a pattern of fluid metering orifices 48 arranged to cooperate with conduit 34 such that the total area of fluid flow permitting orifices exposed to conduit 34 may be varied by axial movement of the first movable member 38. The second movable member 40 includes a metering edge 50 further operative with the orifice pattern 48 to vary flow permitting area as a function of axial movement of said second movable member. $P_1$ pressure fluid from conduit 32 is transmitted to valve inlet chamber 52 formed by housing 36 and said first and second movable valve members. The $P_1$ fluid contained in chamber 52 acts on the surface of movable valve member 40 producing a force tending to urge said valve member to the left or in the direction to increase the available flow permitting area of orifice pattern 48. $P_2$ fluid from downstream of variable orifice 22 is transmitted through conduits 54 and 56 to the chamber 44 where it is operative in conjunction with spring 42 to produce a force acting on the second movable member 40 tending to urge it to the right or in a direction to decrease the area of orifice pattern 48 available to permit flow to conduit 34. Assuming for the moment that the first movable valve member 38 is fixed with respect to housing 36, it will then be seen that the second movable valve member 40 is controlled as a function of the $P_1$—$P_2$ pressure differential in the chambers 52 and 44 respectively. Thus if the pressure differential across variable orifice 22 should momentarily be higher than a predetermined desired value, movable valve member 40 will be displaced to the left by the tendency of the increased pressure differential to overcome a reference force applied by spring 42, thus permitting increased flow of by-passed fluid through the conduits 32 and 34 and a reduction of fluid to the variable orifice 22 to correct for the increased pressure differential. A movable valve member such as member 40 has at least two significant disadvantages: first, as the valve member moves to correct for departures from the desired pressure differential across orifice 22 it tends to elongate or compress the spring 42 thus changing the reference force and the $P_1$—$P_2$ pressure differential necessary to hold movable valve member 40 in balance; second, as the fluid passes by the metering edges 50 through the restrictive orifices 48 it will increase in velocity and decrease in pressure thus causing a fluid pressure unbalance across the movable valve member 40 to cause it to vary from its desired position. These disadvantages are shown graphically in FIGURE 3 and will be discussed further in connection with the description of said figure. The action of second movable valve member 40 may be characterized as "proportional" in that as the member 40 moves to permit increased flow through conduits 32 and 34, spring 42 is compressed proportionally in response to the movement of member 40 thus providing a proportionally increased reference force which must be balanced by a proportionally increased $P_1$—$P_2$ pressure differential.

First movable member 38 heretofore assumed to be fixed is movable in a manner to be discussed below. $P_2$ fluid is transmitted from conduit 54 through the branch conduit 58 and restrictive damping bleed 60 to the annular chamber 62 where it is operative to produce a force on the piston 46 urging it to the left. The fluid in chamber 62 is designated as $P_2'$ fluid to signify that pressure fluctuations are dampened from those designated $P_2$. Piston 46 forms another chamber 64 with the housing 36 which contains $P_x$ servo fluid operative to urge piston 46 to the right. $P_x$ servo fluid is supplied to chamber 64 through conduit 66 and damping bleed 68 from the head sensing device 31 in a manner to be hereinafter described.

Head sensing device 31 is comprised of housing 70 having an interior chamber 72 into which $P_2$ fluid is transmitted by conduit 74; a bellows 76 secured on one end to the housing 70 and communicating interiorly with $P_1$ fluid obtained through conduits 78 and 80 from upstream of variable orifice 22; an end plate 79 secured to the movable end of bellows 76 and adapted to contact one end of a spring 81; and means for controlling the other end of spring 81 including retainer 82, fluid temperature compensating disc members 83, and screw member 84 threadedly secured to the housing 70 and held in position by jam nut 86. A bleed passage 77 is formed in the end plate 79 which permits the purging of any entrapped air in bellows 76, but is constructed sufficiently small so as not to have any other significant effect on the head sensor. Head sensing device 31 further includes a lever 88 pivotally secured about a point intermediate to its ends and connected on one end to the end plate 79 so as to be pivotable in response to the movements of bellows 76. Lever 88 is operative with an orifice 90 to control the flow of fluid therethrough depending on the relative proximity of the lever 88 to said orifice. If lever 88 should completely close off orifice 90, $P_x$ fluid will equal $P_1$ fluid supplied from conduit 80. If, however, lever 88 is in its wide open position permitting maximum opening of orifice 90, fluid pressure in conduit 66 will drop because of this restrictive action of servo bleed 92 retarding the flow of $P_1$ fluid. Under this condition, $P_x$ fluid pressure in chamber 64 will approach $P_2$ fluid contained in chamber 72 of the head sensing device 31. Intermediate positions of lever 88 will cause $P_x$ fluid in chamber 64 to have values intermediate to $P_1$ and $P_2$. When lever 88 is in a neutral position, such as is shown in FIGURE 1, the value of $P_x$ servo fluid maintained may be designed to be just sufficient to balance out the fluid pressure forces urging the first movable valve member 38 to the left such that said valve member will be maintained in a fixed position. Any departure of lever 88 from this neutral position will cause $P_x$ fluid to either increase or decrease and cause the movable valve member 38 to move either to the right or the left respectively. Lever 88 is maintained in its neutral no-movement position when the force unbalance caused by $P_1$—$P_2$ fluid pressure acting on bellows 76 is balanced out by the force applied by spring 81 to the movable end plate member 79. Thus the spring 81 produces a reference force operative to determine the $P_1$—$P_2$ fluid pressure differential acting across the variable orifice 22. For example, should $P_1$—$P_3$ exceed the reference value supplied by spring 81, lever 88 will be pivoted counterclockwise opening orifice 90 and decreasing $P_x$ servo fluid in chamber 64. As $P_x$ servo fluid is decreased the first movable valve member 38 will move to the left and permit more fluid to be bypassed through the conduits 32 and 34 and thus cause a flow decrease through the variable orifice 22. The flow decrease through the variable orifice 22 will then restore the $P_1$—$P_2$ pressure differential to the value determined by spring 81. Assume for the moment that second movable valve member 40 is fixed relative to the first movable valve member 38 and first movable valve member 38 is slideable relative to the housing 36. Such an arrangement may be termed to have "integrating" action. The valve action is integrating in the sense that any given departure of $P_1$—$P_2$ pressure differential from the desired reference value supplied by spring 81 will cause the piston 46 and first movable valve member 38 to move and said valve member will continue to move until the pressure differential error is corrected. The net change in position of piston 46 will be proportional to the integral taken with respect to time of the input error or deviation of $P_1$—$P_2$ force on bellows 76 from the reference force of spring 81. Hence the term "integrating action" refers to the relationship of output travel to input error. Reference is made to commonly assigned U.S. Patent 3,007,514 in the name of Wayne E. Werts issued November 7, 1961, showing and describing in detail an integrating pressure differential regulating valve. "Integrating" valve action is not subject to the disadvantages noted with respect to the proportional action type valve. That is, the position of movable valve member 38 is not affected by either a fluid pressure unbalance or variation in applied force from spring 42 inasmuch as its movement and thus resultant position is controlled solely in response to the $P_1$—$P_2$ pressure differential acting on bellows 76 and the force applied by reference spring 81. Valves having "integrating" action however are generally unstable due to the absence of stabilizing means. In order to provide stability, damping bleeds 60 and 68 are incorporated in the conduits 58 and 66 respectively. The incorporation of damping means, however, such as the bleed 60 and 68 has a further disadvantage of increasing the response time of the first movable member 38 with respect to changes sensed by bellows 76. Thus by providing a valve assembly having a first movable valve member having integrating action and a second movable valve member having proportional action the overall valve assembly will have operating characteristics not subject to the disadvantages of either an integrating action type valve or a proportional action type valve separately. Specifically the "integrating" action valve member 38 is not subject to compression spring error or fluid pressure unbalanced error while the second movable valve member 40 provides a rapid response normally lacking in a dampened "integrating" action type valve.

Figure 2:
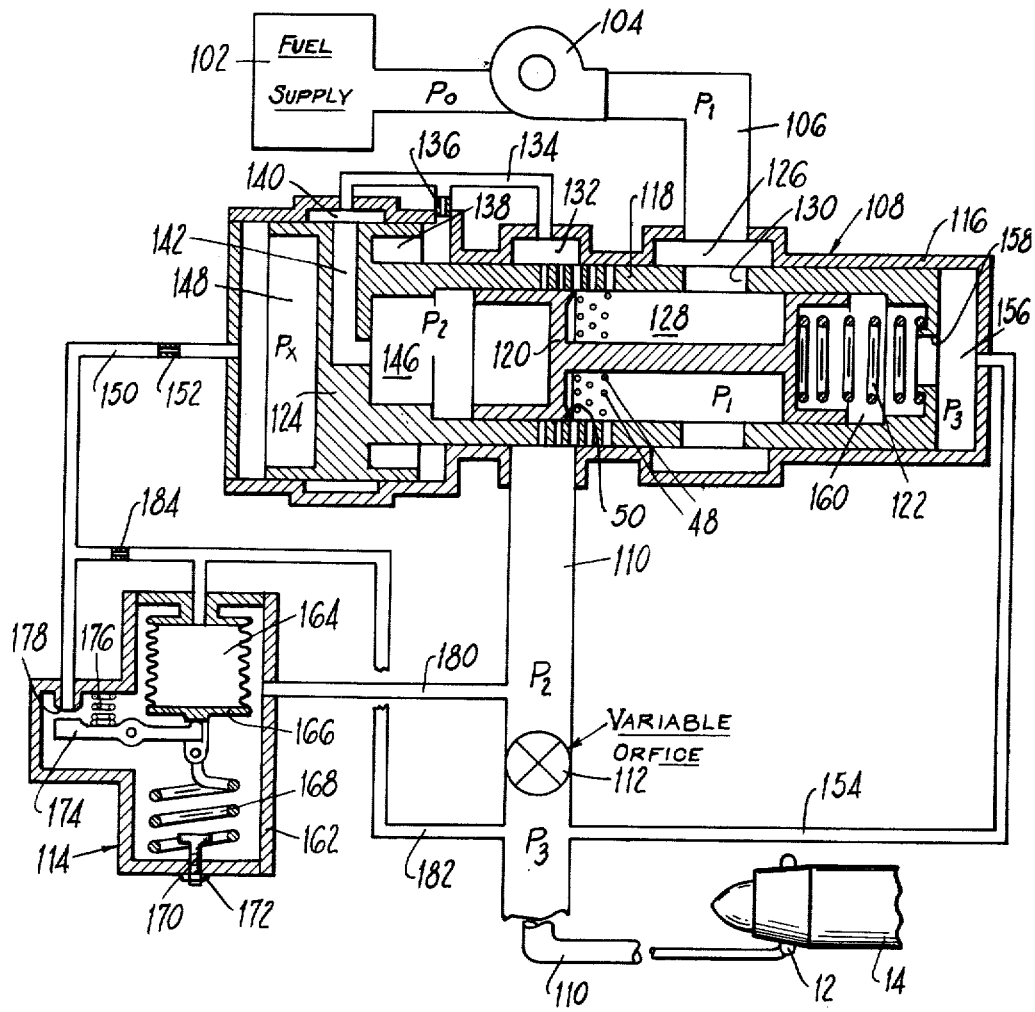
FIGURE 2 is a sectional schematic of a second form of our head control valve operating as a throttling valve in a system for supplying fuel to an engine.

In FIGURE 2, there is shown a modification of our fluid control valve acting as a throttling valve also for controlling a head across a variable orifice. In this figure, fuel supply source 102 is shown for supplying low pressure $P_0$ fluid to the impositive displacement pump 104. High pressure $P_1$ fluid is discharged into conduit 106 where it is transmitted to the valve apparatus generally indicated at 108. Fluid exits from the valve apparatus 108 through a conduit 110 at a reduced pressure designated $P_2$ in the manner later to be described in detail. A variable orifice 112 is contained in conduit 110 and may be considered similar to the variable orifice formed by opening 22 and metering valve 24 shown in FIGURE 1. Fluid pressure in conduit 110 is reduced in pressure upon passing through variable orifice 112 and is designated $P_3$ fluid and is transmitted to the manifold 12 of the engine 14. The novel throttling valve arrangement shown in FIGURE 2 includes the valve apparatus generally indicated at 108 and the head sensing device 114. This throttling valve arrangement controls the fluid pressure differential across the variable orifice 112 in the following manner: if the pressure differential across orifice 112 exceeds a predetermined desired amount this excess pressure differential is sensed by head sensing device 114 which positions the valve apparatus 108 such that the flow through the conduits 106 and 110 is restricted thus increasing the $P_1$ pressure at the outlet of pump 104 and diminishing the amount of fluid being passed by the pump 104. The reduced supply of fluid through pump 104 then also causes a resultant reduction of fluid through the variable orifice 112, which is in series flow relationship with said pump, reducing the pressure differential across said variable orifice back to its desired amount. The valve apparatus 108 is comprised of a housing 116, a first movable valve member 118 slideable in said housing, a second movable valve member 120 concentric with and slideable in said first movable valve member, and a spring 122 contained between said first and second movable valve members. The first movable valve member 118 includes a piston 124 formed on one end thereof and a pattern of orifices 48 along its length which cooperate with the conduit 110 to permit the passage of fluid therethrough. The second movable valve member 120 includes a metering edge 50 operative with an orifice pattern 48 to aid in controlling the effective flow permitting area. $P_1$ fluid from conduit 106 enters housing 116 at annular chamber 126 and is further transmitted to the interior chamber 128 through the opening 130 in said first movable valve member. $P_1$ fluid in chamber 128 is in communication with the orifices 48 which permit restrictive passage of fluid into annular chamber 132 and conduit 110, said passage of fluid being dependent on the relative positions of said first and second movable valve members with respect to housing 116. $P_2$ fluid from annular chamber 132 is conveyed by conduits 134 and damping bleed 136 to chamber 138 where it acts on the face of piston 124 producing a force tending to urge said piston to the left. $P_2$ fluid from conduit 134 is also transmitted in an undampened state to annular chamber 140 where it is conveyed through conduit 142 formed in the piston 124 to the interior chamber 146 formed by said first and second movable valve members. $P_2$ fluid in chamber 146 is operative to act on the face of piston 124 producing a further force tending to urge said piston to the left. Chamber 148 is formed by the left face of piston 124 and the housing 116 and is supplied $P_x$ servo fluid through a conduit 150 and damping bleed 152, the origin of which will later be described in detail. $P_x$ servo fluid acts over the surface of piston 124 producing a force tending to move said piston and the first movable valve member 118 to the right. Lastly, $P_3$ fluid from conduit 110 downstream of variable orifice 112 is transmitted through conduit 154 to the right end of housing 116 and into a chamber 156 formed by said housing and the first movable valve member 118. Fluid in chamber 156 effectively acts on a portion of the first movable valve member equal to its annular transverse cross sectional area producing a still further force tending to move said valve member to the left. A second movable valve member 120 communicates with $P_2$ fluid in chamber 146 to absorb a force tending to urge said member to the right. $P_3$ fluid in chamber 156 passes through the opening 158 in the first movable valve member and into spring containing chamber 160 where said fluid acts on a second movable valve member and with spring 122 produces a force urging said member to the left.

Head sensing device 114 consists of a housing 162, a bellows 164 fixed on one end to the interior of said housing, an end plate 166 enclosing the movable end of bellows 164 and the spring 168 attached at one end to the end plate 166 and on the other to the holding screw 170 which is threadedly secured to the housing 162 and firmly held by jam nut 172. The head sensing device further includes a pivotable lever 174 which is held in contact on one end with the end plate 166 by means of a light spring 176 which is inserted between said lever and housing 162 and an orifice 178 arranged in close proximity to the other end of lever 174. $P_2$ fluid is transmitted from the conduit 110 to the interior of housing 162 of the head sensing device 114 by means of conduit 180 where said fluid surrounds the bellows 164 exteriorly. $P_3$ fluid from the conduit 110 is transmitted by conduit 182 to the interior of bellows 164 and also through servo bleed 184 to the conduit 150 which contains the variable servo control orifice 178. Thus the throttling valve apparatus shown in FIGURE 2 is comprised of a first movable valve member 118 having integrating action and the second movable valve member 120 having proportional action similar to that of the valve apparatus shown in FIGURE 1. The pressure differential across the variable orifice 112 is $P_2$—$P_3$ and is transmitted by conduits 134 and 154 to the opposite sides of the second movable valve member 120 to position said movable member with the aid of spring 122 in response to $P_2$—$P_3$ pressure differential. The first movable valve member 118 is controlled by the fluid pressures acting on the piston 124, and more specifically by the value of the $P_x$ servo fluid contained in the chamber 148. As in the case of the valve apparatus shown in FIGURE 1, the $P_x$ servo fluid operative with the valve apparatus in FIGURE 2 has a value wherein it is just sufficient to balance out the fluid pressure forces and hold the movable valve member in a fixed position. This no-movement value of $P_x$ occurs when the force acting across the bellows 164 and the head sensing device 114 equals the reference force applied by the spring 168 to hold the lever 174 in a neutral position. Any departure in the $P_2$—$P_3$ pressure differential acting on bellows 164 from that sufficient to balance out the reference force supplied by spring 168 will cause a movement of lever 174 and a resultant variation in $P_x$ servo fluid from its no-movement value.

Figure 3:
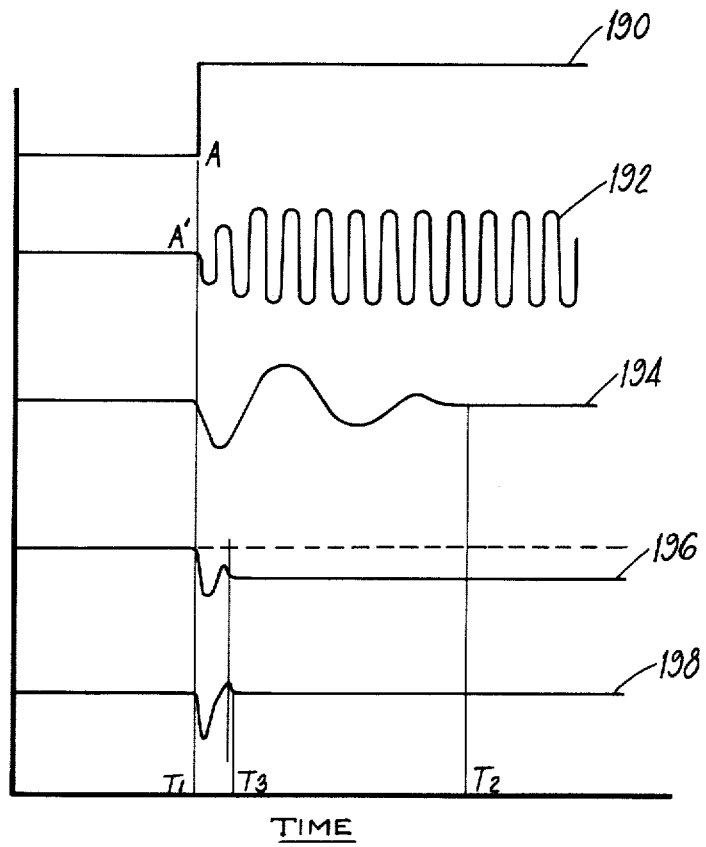
FIGURE 3 is a graph showing operating characteristics of the present invention and prior art devices.

FIGURE 3 is a graph having a series of individual curves 190, 192, 194, 196 and 198 showing some dynamic operating characteristics of the present invention and prior art head control valves. The abscissa of all curves is taken with respect to time. The ordinate of curve 190 is the effective area of variable orifice 22 shown in FIGURE 1, or the area of variable orifice 112 shown in FIGURE 2. Thus the curve 190 shows a step change in effective area of the variable orifice with respect to time, as for example may occur when a fuel control device such as device 26, shown in FIGURE 1, would rapidly withdraw metering valve 24 away from the orifice 22. The curve 192 has as an ordinate the pressure differential across the variable orifice 22 of FIGURE 1 or 112 of FIGURE 2. The curve illustrates how the head across such a variable orifice would be controlled by a valve having integrating action only when the variable orifice is varied as shown by curve 190. For example in the valve apparatus shown in FIGURE 1, if the second movable valve member 40 is fixed with respect to first movable valve member 38 and damping means such as bleed 60 and 68 were not included in the system, the valve apparatus would control the head across the variable orifice 22 in accordance with the curve shown at 192. Due to the absence of stabilizing means on the first movable valve member 38, the valve operation will become unstable upon a step change in the variable orifice area. This valve instability is shown as regenerative by curve 192 with the amplitude of the pressure differential variations being limited only by the total swing of the valve. Curve 194 shows the operating characteristics of an integrating action valve employing damping means such as bleed 60 and 68 shown in FIGURE 1 to provide valve stability and a degenerative effect to the fluid pressure differential variations. The elapsed time from time $T_1$ to time $T_2$ represents an extended period of time necessary for an integrating action type valve which includes damping means to completely stabilize out. Curve 196 represents the operating characteristics of a valve having proportional action only such as for example would occur if the first movable valve member 38 of the valve apparatus shown in FIGURE 1 were fixed with respect to housing 36 and the second movable valve member 40 were movable with respect to said fixed first movable valve member. The ordinate of curve 196 is also the pressure differential across the variable orifice 22.

It should be noted from the curve 196 that the proportional action type valve has rapid response and good stability represented by the small elapsed time from point $T_1$ to point $T_3$. However upon stabilizing out, curve 196 shows that in proportional action type valves that there is a departure in the pressure differential controlled before and after the step change of the variable orifice. This departure is represented by the difference between the solid and dashed line of curve 196 after the time $T_3$. This departure is caused by two previously mentioned characteristics of a proportional action type valve i.e., fluid pressure unbalance across the valve and variation in the loading effect of spring 42 due to its compression or elongation. Curve 198 represents the operating characteristics of a valve apparatus such as disclosed in FIGURES 1 and 2 combining favorable aspects of both proportional and integrating action type valves. It is noted that the small response time and good stability of the proportional action type valves is obtained such that our novel valve apparatus would completely stabilize out the time differential $T_1$—$T_3$ which is characteristic of a proportional action valve. At the same time the integrating action of the first movable valve member is operative to prevent error due to the spring or fluid pressure unbalanced effect associated normally with proportional action valves.

*Operation*

The operation of the valve apparatus shown in FIGURE 1 acting as a by-pass valve may be fully understood by a consideration of its operation when the pressure differential across the variable orifice 22 departs from a desired predetermined amount. Therefore, it may first be assumed that the pressure differential across the variable orifice 22 is first equal to the predetermined amount. Under this condition the force due to the $P_1$—$P_2$ pressure differential acting on bellows 76 is balanced out by the reference force supplied by the spring 81 such that the lever 88 is held in its neutral or no-movement position. $P_x$ servo fluid in chamber 64 then is just sufficient to balance out the fluid pressure forces acting on piston 46 and first movable valve member 38 such that said movable valve member is maintained in a fixed position. At the same time the $P_1$—$P_2$ pressure differential acting on the second movable valve member 40 is just sufficient to offset the force provided by spring 42. The amount of fluid being by-passed through conduits 32 and 34 under these conditions is also just sufficient to maintain the fluid flow through variable orifice 22 at the amount necessary to maintain the desired pressure differential. Now, however, assume that the fuel control 26 moves the metering valve 24 towards the orifice 22 thus reducing the size of the variable orifice causing a $P_1$—$P_2$ pressure differential increase. This pressure differential increase is felt first by the second movable valve member 40 and second by the bellows 76 to provide correcting changes. Increased $P_1$—$P_2$ pressure differential acting on the second movable valve member 40 will cause it to move to the left and permit increased fuel to be by-passed through the conduits 32 and 34. This increased flow through the conduits 32 and 34 will reduce the flow of fluid being delivered to the variable orifice 22 thus partially restoring the pressure differential to its predetermined amount. The $P_1$—$P_2$ pressure differential acting on bellows 76 will move the end plate 79 downward and the lever 88 away from the orifice 90. In response to the movement of lever 88 away from the orifice 90, $P_x$ servo fluid will be decreased allowing the first movable valve member 38 to move to the left and further increase the fluid permitting area of orifice pattern 48 and further increased flow of by-pass fluid through the conduits 32 and 34. The dynamic operating characteristics of the valve apparatus during the above described operation will be as shown by the curve 198 of FIGURE 3. When fuel control 26 is operative to withdraw metering valve 24 away from orifice 22 the pressure differential across said variable orifice will decrease. This decrease $P_1$—$P_2$ pressure differential will be sensed by second movable valve member 40 and the bellows 76 thus causing first and second movable valve members 38 and 40 to move to the right and decrease the amount of by-pass fluid flow through the conduits 32 and 34. The temperature compensating discs 83 in the head sensing device 31 are operative to vary the position of retainer 82 and thus the reference force applied by spring 81 to the end plate of bellows 76 as a function of the temperature of fluid surrounding said discs. Thus any variations in the fluid rates supplied to the manifold 12 and the engine 14 due to changes in temperature of the fluid being metered may be compensated for by varying the reference force applied by spring 81 by means of the temperature compensating discs 83.

The operation fo the valve apparatus shown in FIGURE 2 may also be disclosed by consideration of its operation as the $P_2$—$P_3$ differential across the variable orifice 112 departs from a predetermined desired value. Assuming first that the $P_2$—$P_3$ differential is equal to the desired value, the force produced by the pressure differential acting across bellows 164 is balanced out by the reference force applied by the spring 168 to the movable end of the bellows 164. In this condition, the lever 174 is in its neutral or no movement position whereby the $P_x$ servo fluid is maintained at a value sufficient to balance out the fluid pressure forces acting on the first movable valve member 118. Also the $P_2$—$P_3$ pressure differential contained in chambers 146 and 160 of the valve apparatus 108 and acting on the opposite ends of second movable valve member 120 is operative with a spring 122 to permit a measured amount of fluid to flow through the orifice pattern 48 and into the conduit 110. This value of fluid flowing through the orifice pattern 48 is the same as that passing through the variable orifice 112 and is sufficient to maintain a desired $P_2$—$P_3$ pressure differential. Now, if the variable orifice 112 should move in a closing direction so as to obstruct the flow of fluid therethrough, $P_2$—$P_3$ pressure differential across said orifice will increase. This increase in $P_2$—$P_3$ pressure differential acting on bellows 164 will tend to compress said bellows and move lever 174 counterclockwise opening orifice 178 and increasing $P_x$ servo fluid pressure. An increase in $P_x$ servo fluid pressure will allow the first movable valve member 118 to move to the right and further restrict the fluid flow through orifices 48. At the same time the $P_2$—$P_3$ pressure differential acting on the movable valve member 120 will position said member to the right causing a further reduction in the fluid flow permitting area of orifices 48. A resultant reduction of the area of orifice pattern 48 will cause an increase in $P_1$ pressure fluid in conduit 106 thus allowing less fluid to flow to the impositive displacement pump 104. This reduction in fluid flow from the pump 104 through conduit 106 will be effective to reduce the fluid flow in conduit 110 and through variable orifice 112 thus restoring $P_2$—$P_3$ pressure differential to its predetermined value. In event the variable orifice 112 should increase in area, the $P_2$—$P_3$ pressure will momentarily decrease causing substantially the reverse operating sequence of movable valve members 118 and 120 such that the flow through conduit 110 is again increased thus restoring $P_2$—$P_3$ differential to its original predetermined value.

It should be understood, that the operation of the fluid control valve shown in both FIGURES 1 and 2 is in accordance with the curve 198 of FIGURE 3 thus providing the desirable operating characteristics which it is an object of this invention to provide.

Although only two embodiments of the invention have been illustrated and described it will be apparent to those skilled in the art that various changes in the structure and relative arrangement of parts may be made to suit individual requirements without departing from the spirit and scope of the present invention.

We claim:
1. A valve assembly for controlling the fluid pressure differential across a variable size fluid restricted orifice comprising: a housing having a port for permitting the flow of fluid, a first movable valve member contained in said housing and slidable in first and second directions, said first movable member including a pattern of holes operative with said port to form a variable fluid flow permitting area which increases in effective flow permitting area when said first movable member moves in said first direction and decreases in effective flow permitting area when said first movable valve member moves in said second direction, conduit means connecting said variable fluid flow permitting area with the variable size orifice such that the fluid flow through and pressure differential across the variable size orifice is controlled as a function of the effective area of said variable fluid flow permitting area, a servo piston connected to said first movable valve member and operative to position said first movable valve member in said first and second directions as a function of a control fluid pressure acting thereon, head sensing means operative to sense the pressure differential across the variable size orifice, said head sensing means including a servo control device and connected to said servo piston to vary the control fluid pressure acting thereon as a function of the pressure differential across the variable size orifice, a second movable valve member contained within said first movable member and also movable in said first and second directions, said second movable member including a metering edge operative with said pattern of holes to vary the effective flow permitting area thereof as a function of the position of said second movable valve member, and means for transmitting the fluid pressure differential across the variable size orifice to said second movable valve member such that said second movable valve member is positioned as a function of the pressure differential across the variable size orifice.

2. A valve assembly as claimed in claim 1 including resilient means operative to bias said second movable valve member in said second direction.

3. A valve assembly as claimed in claim 1 including damping means for damping out fluid pressure variations acting on said servo piston.

4. A valve assembly as claimed in claim 1 wherein said head sensing means includes means operative to control said servo control device as a function of the temperature of the operating fluid.

5. A valve assembly for controlling the fluid pressure differential across a variable size orifice comprising: a housing having a port for permitting the flow of fluid, a first movable valve member having at least one flow permitting orifice therein operative with said port to form a fluid flow permitting area which is variable in response to the movement of said first movable member, conduit means connecting said fluid flow permitting area with the variable size orifice such that the fluid flow through and pressure differential across the variable size orifice is controlled as a function of the effective area of said fluid flow permitting area, servo means connected to said first movable member for controlling the movement thereof, head sensing means sensing the fluid pressure differential across the variable size orifice and connected to said servo means for controlling the operation thereof as a function of the pressure differential, a second movable valve member including a metering edge operative with said first movable valve member to further vary said fluid flow permitting area, and means for transmitting the fluid pressure differential to said second movable valve member for controlling the position of said second movable valve member as a function of the pressure differential.

6. A valve assembly for controlling the fluid pressure differential across a variable size orifice comprising: a fixed sleeve having a first opening therein, a first movable valve member slidable within said sleeve and having a second opening cooperating with said first opening so as to form a variable flow permitting area, means connecting said variable flow permitting area with the variable size orifice such that the flow through and pressure differential across the variable size orifice is controlled by variations in said flow permitting area, servo means responsive to the pressure differential across the variable size orifice and connected to said first movable valve member to control the movement thereof as a function of the pressure differential, a second movable valve member actuated by the pressure differential across the variable size orifice and including a metering edge operative with said flow permitting area to further vary the area thereof as a function of the movement of said second movable member.

7. A valve assembly for controlling the fluid pressure differential across an orifice comprising: first and second movable valve members forming a flow permitting area that is variable as a function of the movement of either of said movable valve members, means connecting said flow permitting area with the orifice such that the flow through and pressure differential across the orifice is controlled by variations in said flow permitting area, servo means responsive to the fluid pressure differential across the orifice and connected to said first movable valve member for controlling the direction and rate of movement thereof as a function of the pressure differential, and means transmitting the fluid pressure differential across the orifice to said second movable valve member so that said second movable valve member is controlled in position as a function of the pressure differential across the orifice.

8. A valve assembly as claimed in claim 7 including resilient means operative to bias said second movable valve member in a direction opposing the movement caused by the pressure differential across the orifice.

9. A valve assembly as claimed in claim 7 including damping means operative with said servo means for damping the movement of said first movable valve member in response to changes in the pressure differential across the orifice.

10. A valve apparatus responsive to a fluid pressure differential comprising: a housing having fluid inlet and outlet ports therein, first and second axially slidable valve members forming a flow permitting area with one of said housing ports that is variable as a function of the axial movement of either of said valve members, a bellows communicating with said fluid pressure differential and having a force output that varies as a function of said fluid pressure differential, reference means providing a reference force opposing the force output of said bellows and indicative of a predetermined pressure differential, servo means connected to said reference means and said bellows and controlled as a function of the difference between said fluid pressure differential and said predetermined pressure differential, said servo means connected to said first axially slidable valve member to control the direction of movement thereof in a first axial direction when said fluid pressure differential exceeds said predetermined pressure differential and to control the direction of movement in a second axial direction when said fluid pressure differential is less than said predetermined pressure differential, and means for transmitting said fluid pressure differential to said second axially slidable valve member to control the axial position thereof as a function of said fluid pressure differential.

11. A valve apparatus responsive to a fluid pressure differential comprising: first and second valve members axially movable in two directions and forming an orifice that is variable in size as a function of the movement of either of said valve members, a bellows communicating with said fluid pressure differential and having a force output that varies as a function of said fluid pressure differential, first reference means providing a reference force opposing the force output of said bellows and indicative of a predetermined pressure differential, servo means connected to said bellows and said first valve member to control the direction of movement thereof as a function of the direction of departure of said fluid pressure differential from said predetermined pressure differential, second reference means providing a reference force to said second valve member indicative of said predetermined pressure differential, and means transmitting said fluid pressure differential to said second valve member to provide a force operative with said reference force to position said second valve member in a direction and at a rate dependent on the difference between said reference and said fluid pressure differential force.

12. A valve apparatus comprising: first and second movable valve members forming an orifice that is variable as a function of the movement of either of said valve members, a bellows for receiving an input pressure signal, said bellows having an end movable in response to said input pressure signal, reference means connected to said bellows for applying a reference force opposing the movement of said movable end, a movable lever having one end connected to the movable end of said bellows such that said lever is movable as a function of the difference between the forces produced by said input signal and said reference means, servo piston member secured to said first valve member to control the position thereof, servo control fluid means fluidly interconnecting said piston member and said movable lever to control the direction and rate of movement of said piston member in response to the position of said movable lever means transmitting said input pressure signal to said second movable valve member to position said valve member as a function of said input pressure signal, and stabilizing means connected to said second movable valve member for opposing and stabilizing the movement thereof caused by said input pressure signal.

13. A valve assembly for controlling a fluid pressure differential across a metering orifice comprising: first and second movable valve members separately responsive to the fluid pressure differential and operative to control the value of the fluid pressure differential by varying the rate of fluid flow through the metering orifice; a first reference means producing a force operative to indicate a first desired pressure differential; said first movable valve member connected to said first reference means and having integrating action such that the fluid pressure differential is controlled in a direction to eliminate any error between the fluid pressure differential and said first desired pressure differential; second reference means producing a force operative to indicate a second desired pressure differential; said second movable valve member connected to said second reference means and having proportional action such that any error between the fluid pressure differential and said second desired pressure differential is reduced at a rapid rate.

14. A valve assembly as claimed in claim 13 wherein said first and said second desired pressure differentials are equal.

15. A valve assembly as claimed in claim 13 wherein said first reference means is a spring which is operative to produce a force indicative of a desired pressure differential.

16. A valve assembly as claimed in claim 13 wherein said second reference means is a spring which is operative to produce a force indicative of a desired pressure differential.

References Cited in the file of this patent

UNITED STATES PATENTS

| | | |
|---|---|---|
| 2,774,215 | Mock | Dec. 18, 1956 |
| 2,786,460 | Barfod | Mar. 26, 1957 |
| 2,926,681 | Chilman | Mar. 1, 1960 |
| 2,937,656 | Evans | May 24, 1960 |
| 2,957,488 | Farkas | Oct. 25, 1960 |

FOREIGN PATENTS

| | | |
|---|---|---|
| 585,032 | Great Britain | Jan. 29, 1947 |

UNITED STATES PATENT OFFICE
CERTIFICATE OF CORRECTION

Patent No. 3,106,934　　　　　　　　　　　　　　October 15, 1963

Francis R. Rogers et al.

It is hereby certified that error appears in the above numbered patent requiring correction and that the said Letters Patent should read as corrected below.

Column 1, line 66, for "designed" read -- designated --; column 5, line 9, after "its" insert -- original --.

Signed and sealed this 19th day of May 1964.

(SEAL)
Attest:
ERNEST W. SWIDER

Attesting Officer

EDWARD J. BRENNER
Commissioner of Patents